United States Patent Office 2,852,432
Patented Sept. 16, 1958

---

2,852,432

PROCESS FOR PURIFICATION OF RELAXIN BY ION EXCHANGE

George E. Phillips, Morristown, N. J., assignor to Warner-Lambert Pharmaceutical Company, a corporation of Delaware No Drawing. Application August 11, 1953
Serial No. 373,689

12 Claims. (Cl. 167—74)

This invention relates to relaxin and aims to provide an improved process for the purification of relaxin preparations.

Relaxin is believed to be a hormone of pregnancy. It has aroused great interest in the field of medical research. The chemical nature of relaxin is not known. However, there is evidence that it consists of one or more proteins and, for convenience in describing my invention, it will be assumed that relaxin is protein.

Relaxin is generally obtained in crude form by extraction of pregnant hog ovaries. The processes heretofore available for the purification of relaxin extracts are generally based on the treatment thereof with solvents and precipitation agents. Such processes are frequently time-consuming, uneconomical and of low operating efficiency.

I have discovered that relaxin preparations, including extracts, may be purified through a simple, rapid process which is much less expensive than the processes which have been employed in the past. My process may be used, not only to purify crude relaxin extracts, but also, to increase the biological potency of relaxin preparations obtained by previously known purification procedures. The purity of a relaxin preparation can be increased, in accordance with my invention, by causing an aqueous solution thereof to come into contact with a suitably buffered carboxylic acid type cation exchange resin.

Relaxin is usually contaminated with various proteins, some of which possess isoelectric points higher than that of relaxin, while others have isoelectric points lower than that of relaxin. Those proteins in a relaxin preparation whose isoelectric points are higher than that of relaxin may be removed by adjusting an aqueous solution of the preparation to a pH value slightly above the isoelectric point of relaxin. The resulting solution is then brought into contact with a carboxylic acid type cation exchange resin buffered at the same pH, whereupon only those proteins whose isoelectric points are substantially higher than that of relaxin exist as cations and are adsorbed on the resin. Relaxin may then be recovered by washing the resin with the buffer used to prepare the resin.

Likewise, in order to remove from the relaxin preparation those proteins whose isoelectric points are below that of relaxin, an aqueous solution of that preparation is adjusted to a pH value slightly below the isoelectric point of relaxin. The solution is then brought into contact with a carboxylic acid type cation exchange resin buffered at the same pH value, whereupon relaxin is adsorbed on the resin. The proteins whose isoelectric points are substantially below that of relaxin may now be removed from the column by washing with water, by reason of their existence mainly as anions. Adsorbed relaxin can then be recovered by elution from the resin by treating the latter with an acid solution. While the two types of operations described above may be run separately from each other, I prefer to run them successively in a convenient arrangement "in series."

Carboxylic acid type cation exchange resins are known. They possess a common characteristic in that their ion exchange ability is dependent upon the presence of carboxyl groups in the resin structure. They are generally formed either by condensation of a phenolic carboxylic acid and an aldehyde or by the copolymerization of a polymerizable acid with a divinyl compound. Resins of this type are described in U. S. Patents Nos. 2,319,359; 2,333,754; 2,340,110; 2,340,111; and 2,541,420. The ion exchange resins which are preferred in the practice of this invention are copolymers of acrylic or methacrylic acid and divinyl benzene wherein the divinyl benzene component constitutes from 2½ to about 5% of the resin composition.

In the event that a relaxin preparation, either prior to or after treatment with a carboxylic acid type cation exchange resin, is contaminated by electrolytes, the latter are preferably removed by dialysis or by treatment of an aqueous solution of the relaxin preparation with a sulfonic acid type cation exchange resin (acid form) which adsorbs inorganic cations but leaves unadsorbed essentially all the proteins contained in said preparation. The acid or acids liberated in effluent as a result of the removal of inorganic cations, may be removed by treatment of the effluent with an anion exchange resin in the conventional manner until the pH of the effluent rises from its initially low value to about 5. Product fractions of relaxin from which electrolytes have been removed in the manner described above may then be freeze-dried to furnish purified relaxin in a solid form suitable for incorporation in pharmaceutical formulations.

In the process of this invention the cation exchange resin and relaxin solution may be brought into contact with each other either by agitating a suspension of the resin in the relaxin solution (batch method) or by allowing the relaxin solution to flow through a column of the resin contained within a tube (column method). Although the batch method is frequently more rapid than the column method, the latter is preferred because it provides a greater exchange capacity for a given quantity of resin.

Although the process of this invention is operative over a wide range of pH values, it will be apparent from the results of the following experiments that the purification of relaxin is more efficient at certain pH values than at others.

In the series of experiments described in the examples given below, portions of a carboxylic acid type ion exchange resin were stirred with buffered solutions of various pH values. Those resin portions were washed with water to remove excess buffer solutions and then placed in a column 2 cm. in diameter and 10 cm. high. In each case, a solution of relaxin preparation was adjusted to the same pH as that of the buffer with which the resin had been treated and the resulting solution was put through the resin column. All material which was not adsorbed on the column could then be washed off the column with water. When the pH is higher than about 7, I prefer to wash the column with buffer identical with that used to prepare the resin. Material which was adsorbed on the resin could be eluted therefrom by treatment with an acid solution, as carboxylic acid type cation exchange resins possess a high affinity for hydrogen ion, and any adsorbed cation can be desorbed by treatment with dilute acid.

Throughout the various phases of the column method of operation, the liquid emerging from the lower end of the column was collected in measured volumes of 1 to 3 cc. in individual tubes and selected fractions thus collected were characterized in order than an indication of the efficiency of the purification of the relaxin preparation could be obtained.

The percent of starting material in each tube is expressed as the percent of total nitrogen of the starting material. The nitrogen value for each fraction was obtained indirectly as follows: The optical density at 275 millimicrons of a given fraction and that of the starting material were measured (Beckman Spectrophotometer, model DU) and the ratio of the two values thus obtained was taken to be equal to the ratio of the corresponding values of the nitrogen content. Further, since optical density of a protein solution is proportional to the concentration of said solution, the percent of total nitrogen of a given tube will be substantially the same as the percent of the starting material in said tube. Selected samples of the fractions were also assayed for relaxin type biological activity by testing their ability to inhibit normal contraction of isolated uterine strips of mice or by evaluating the in vivo relaxation of guinea pig pubic symphysis.

EXAMPLE I

*Cation exchange of relaxin preparation at pH 4.5*

A sample of a granular carboxylic acid type cation exchange resin consisting of a copolymer of methacrylic acid and divinyl benzene containing about 5% divinyl benzene was stirred with a buffer solution at pH 4.5 and then decanted from the buffer solution and placed in a column in such a manner that the resin occupied a section of the column 2 cm. in diameter and 10 cm. high. Five cc. of an aqueous solution of a relaxin preparation, containing 4,000 guinea pig units of relaxin per cc. was adjusted to pH 4.5 and allowed to flow through the column of ion exchange resin. Following the relaxin solution, a sample of the buffered solution was passed through the column (about 50 cc.) and then the column was eluted with 0.5 N hydrochloric acid (about 100 cc.).

Throughout the foregoing operation, the liquid emerging from the lower end of the column was collected in measured volumes of 1 to 3 cc. in individual tubes and a selected number of fractions thus collected were characterized in order than an indication of the efficiency of the purification of the relaxin preparation might be obtained.

The results are set forth in Table I. Most of the proteins in the solution of relaxin which was applied to the resin column were adsorbed on the resin and eluted therefrom by hydrochloric acid. The data in Table I show that the biologically active material was adsorbed on the resin and eluted therefrom by hydrochloric acid and a small amount of biologically inactive protein was also adsorbed on the resin.

TABLE I

| | Tube No. | Percent Of Total Nitrogen | In Vivo, Relaxation Of Guinea Pig Pubic Symphysis | Inhibition Of Contraction Of Mouse Uterine Strip |
|---|---|---|---|---|
| Exchange Phase (pH 4.5) | 2 | .50 | | |
| | 7 | .37 | Inactive | |
| | 13 | .47 | do | |
| | 17 | .47 | do | |
| | 24 | .86 | | |
| | 32 | 1.1 | | Inactive. |
| | 40 | .76 | | Do. |
| | 43 | .31 | | Do. |
| HCl Elution Phase | 48 | .41 | | Do. |
| | 54 | .35 | | Do. |
| | 61 | .74 | | Do. |
| | 70 | 1.9 | | Very active. |
| | 72 | 3.4 | | Do. |
| | 73 | 3.7 | | Do. |
| | 89 | 1.3 | | Do. |
| | 93 | 1.4 | | Do. |

EXAMPLE II

*Cation exchange of relaxin preparation at pH 5.0*

The procedure used in this experiment is identical with that described under example I except that the pH of the relaxin solution to be purified and that of the buffered resin was 5.0.

The results are set forth in Table II. As compared with the results obtained under Example 1, a better separation of protein materials into two fractions was secured.

TABLE II

| | Tube No. | Percent Of Total Nitrogen | In Vivo, Relaxation Of Guinea Pig Pubic Symphysis | Inhibition Of Contraction Of Mouse Uterine Strip |
|---|---|---|---|---|
| Exchange Phase (pH 5.0) | 4 | 1.12 | | |
| | 6 | 1.61 | | |
| | 10 | 2.22 | | |
| | 13 | 2.09 | | |
| | 15 | 1.21 | | |
| | 17 | 0.75 | | |
| | 19 | 0.98 | | |
| | 23 | 2.09 | | |
| | 25 | 2.77 | | |
| | 28 | 2.01 | | |
| HCl Elution Phase | 31 | 1.54 | | |
| | 34 | 0.64 | | |
| | 37 | 1.17 | | |
| | 40 | 1.27 | | |
| | 46 | 0.80 | | |
| | 48 | 1.43 | | |
| | 50 | 2.41 | | |
| | 54 | 2.41 | | |
| | 57 | 1.31 | | |
| | 60 | 1.19 | | |
| | 66 | 0.88 | | |

EXAMPLE III

*Cation exchange of relaxin preparation at pH 5.5*

The procedure used in this experiment was identical with that described under Example I except that the pH of the relaxin solution to be purified, and that of the buffered resin, was 5.5.

The results are set forth in Table III. The proteins eluted from the resin with hydrochloric acid were a mixture of active and inactive proteins.

TABLE III

| | Tube No. | Percent Of Total Nitrogen | In Vivo, Relaxation Of Guinea Pig Pubic Symphysis | Inhibition Of Contraction Of Mouse Uterine Strip |
|---|---|---|---|---|
| Exchange Phase (pH 5.5) | 4 | 1.6 | Inactive | |
| | 14 | 1.1 | do | |
| | 20 | 1.5 | | Inactive. |
| | 22 | 2.4 | Inactive | |
| | 26 | 1.4 | | |
| | 30 | 2.0 | Inactive | |
| | 36 | .42 | | |
| | 48 | .65 | | |
| | 52 | 1.4 | Inactive | |
| | 60 | .70 | do | |
| HCl Elution Phase | 64 | 1.6 | do | |
| | 68 | .48 | | |
| | 78 | 2.2 | Inactive | |
| | 80 | 2.4 | Active | |
| | 82 | 1.3 | do | |

EXAMPLE IV

*Cation exchange of relaxin preparation at pH 7.0*

The procedure used in this experiment was identical with that described under Example I except that the pH of the relaxin solution to be purified, and that of the buffered resin, was 7.0.

The results are set forth in Table IV. A good separation of active from inactive material was obtained in this experiment.

TABLE IV

| | Tube No. | Percent Of Total Nitrogen | In Vivo, Relaxation Of Guinea Pig Pubic Symphysis | Inhibition Of Contraction Of Mouse Uterine Strip |
|---|---|---|---|---|
| Exchange Phase (pH 7.0) | 3 | .82 | | |
| | 5 | 1.81 | | |
| | 9 | 3.80 | Inactive | Inactive. |
| | 14 | 3.08 | | |
| | 16 | 3.34 | | |
| | 19 | 1.42 | | |
| | 25 | 1.65 | | |
| HCl Elution Phase | 30 | 2.22 | Active | Active. |
| | 37 | 1.72 | | |
| | 40 | 1.12 | | |
| | 46 | 1.20 | | Inactive. |
| | 50 | 1.25 | | |

EXAMPLE V

*Cation exchange of relaxin preparation at pH 7.6*

The procedure used in this experiment was identical with that described under Example I with the exception of the following modifications:

(a) The relaxin solution to be purified had a potency of 4 guinea pig units of relaxin per cc. and the quantity of this solution used was 500 cc.

(b) pH of relaxin solution to be purified and that of buffered resin was 7.6.

(c) Volume of fraction collected per tube was 60 cc.

(d) The nitrogen was determined by the Kjeldahl method.

The results are set forth in Table V. A good separation of active from inactive material was obtained in this experiment.

TABLE V

| | Tube No. | Percent of Total Nitrogen by Kjeldahl) | In Vivo, Relaxation of Guinea Pig Pubic Symphysis | Inhibition of Contraction of Mouse Uterine Strip |
|---|---|---|---|---|
| Exchange Phase (pH 7.6). | 1 | | Inactive | Inactive. |
| | 2 | 7.55 | | |
| | 3 | | | |
| | 4 | | | |
| | 5 | | | |
| | 6 | | | |
| | 7 | | | |
| | 8 | | | |
| | 9 | | | |
| | 10 | 9.44 | Weakly Active (Column leakage). | Do. |
| HCl Elution Phase. | 1 | 4.86 | | |
| | 2 | 1.83 | | |
| | 3 | 5.69 | Very Active | Active. |
| | 4 | 7.45 | | |
| | 5 | 2.22 | Very Active | Very Active. |
| | 6 | 0.43 | | |
| | 7 | 0.26 | Inactive | |
| | 8 | 0.73 | do | |
| | 9 | 0.19 | | |

EXAMPLE VI

*Cation exchange of relaxin preparation at pH 8.6*

The procedure used in this experiment was identical with that described under Example I except that the pH of the relaxin solution to be purified, and that of the buffered resin, was 8.6.

The results are set forth in Table VI. The active principle of the relaxin preparation was unadsorbed on the resin, and a certain amount of inactive material was adsorbed on the resin and eluted therefrom with hydrochloric acid.

TABLE VI

| | Tube No. | Percent Of Total Nitrogen | In Vivo, Relaxation Of Guinea Pig Pubic Symphysis | Inhibition Of Contraction Of Mouse Uterine Strip |
|---|---|---|---|---|
| Exchange Phase (pH 8.6). | 1 | .24 | | |
| | 5 | 3.0 | | |
| | 8 | 4.5 | Active | Active. |
| | 9 | 5.3 | | |
| | 13 | 1.4 | | |
| | 15 | 2.8 | | |
| | 19 | 1.9 | | |
| | 23 | 1.1 | | |
| | 30 | .69 | | Do. |
| | 35 | .51 | | |
| HCl Elution Phase | 1 | 1.1 | | |
| | 5 | 1.1 | | |
| | 15 | 1.0 | | |
| | 20 | 1.3 | Inactive | Inactive. |
| | 25 | 1.1 | | |
| | 30 | .4 | do | Do. |
| | 35 | .57 | | |
| | 40 | 0.6 | Inactive | Do. |

EXAMPLE VII

*Cation exchange of relaxin preparation in batchwise operation*

In this experiment a portion of a granular cation exchange resin consisting of a copolymer of methacrylic acid and divinyl benzene and containing about 5% divinyl benzene was stirred with acetate buffer solution of pH 6.9. A relaxin solution of 4 cc. was diluted to 50 cc. with water and the resulting solution was stirred with 30 g. of the resin (wet weight) for 20 minutes. The supernate, whose pH rose to 7.8 was decanted and the resin washed with about 50 cc. of water. The washed resin, which had adsorbed most of the biologically active material, was divided into two equal parts: One part was eluted with 0.5 N sodium hydroxide at pH 9. The basic supernate was neutralized and was found to contain biologically active material. The other part of the washed resin was eluted with 0.5 N hydrochloric acid. This eluent was also found to contain biologically active material. It will be observed from the data secured in this example that relaxin can be adsorbed from solution by a carboxylic acid type cationic exchange resin at a pH ranging from about 6 to about 8 and the biologically active material can be desorbed by elution with either sodium hydroxide at pH 9 or by hydrochloric acid at a pH value of about 2.

The indications are that the isoelectric point of relaxin lies in the pH range of about 7 to about 8.6. Consequently, in the preferred practice of my invention, the first step consists in collecting relaxin as an effluent from which impurities have been adsorbed by a carboxylic acid type cation exchange resin at a pH of about 8.6. In the second step, the relaxin in the effluent obtained through the first step is adsorbed by a carboxylic acid type cation exchange resin at a pH of about 7 and the purified relaxin may then be eluted from such resin. In this connection it should be noted, however, that if the relaxin occurs in a conjugated form such as a stable salt or complex with another substance at a given pH value, the behavior of said conjugated form toward carboxylic acid type cation exchange resins may be different from that of relaxin itself, and the pH values at which purification occurs should then be modified accordingly.

What I claim is:

1. The process of treating an impure relaxin preparation having a fraction which has an isoelectric point in the pH range of about 7.0 to about 8.6, a second fraction which has an isoelectric point in the pH range below 7.0, and a third fraction which has an isoelectric point in the pH range above 8.6, which comprises: dissolving the said impure relaxin preparation in an aqueous solution brought to a pH in one of said ranges, contacting the said solution with a carboxylic acid type cation exchange resin which has been buffered at the pH of the said aqueous solution, whereby those fractions of the relaxin preparation whose isoelectric points are above the pH of the said aqueous solution are adsorbed on the said cation exchange resin, the aqueous solution being brought to a pH in the range below about 7.0 where it is desired to adsorb the first and third fractions, the aqueous solution being brought to a pH of at least about 8.6 where it is desired to adsorb the third fraction, washing unadsorbed material from the resin, and then eluting adsorbed material from said resin and thereby regenerating the resin.

2. The process of treating an impure relaxin preparation having a fraction which has an isoelectric point in an intermediate pH range of about 7.0 to about 8.6, a second fraction which has an isoelectric point in a lower pH range, and a third fraction which has an isoelectric point in a higher pH range, which comprises: dissolving the said impure relaxin preparation in an aqueous solution brought to a pH in said intermediate range, contacting the said solution with a carboxylic acid type cation exchange resin which has been buffered at the pH of the said aqueous solution whereby those fractions of the relaxin preparation whose isoelectric points are above the pH of the said aqueous solution are adsorbed on the said cation exchange resin, the aqueous solution being brought to a pH near the lower end of said intermediate range where it is desired to adsorb the first and third fractions, the aqueous solution being brought to a pH near the upper end of said intermediate range where it is desired to adsorb the third fraction, washing unadsorbed material from the resin, and then eluting adsorbed material from said resin and thereby regenerating the resin.

3. The process of treating an impure relaxin preparation having a fraction which has an isoelectric point in an intermediate pH range of about 7.0 to about 8.6, a second fraction which has an isoelectric point in a lower pH range, and a third fraction which has an isoelectric point in a higher pH range, which comprises: dissolving the said impure relaxin preparation in an aqueous solution brought to a pH in said intermediate range, contacting the said solution with a carboxylic acid type cation exchange resin which has been buffered at the pH of the said aqueous solution whereby those fractions of the relaxin preparation whose isoelectric points are above the pH of the said aqueous solution are adsorbed on the said cation exchange resin, the aqueous solution being brought to a pH near the lower end of said intermediate range where it is desired to adsorb the first and third fractions, the aqueous solution being brought to a pH near the upper end of said intermediate range where it is desired to adsorb the third fraction, washing unadsorbed material from the resin by means of a buffer identical with that used to prepare the resin, and then eluting adsorbed material from said resin and thereby regenerating the resin.

4. The process of treating an impure relaxin preparation having a fraction which has an isoelectric point in an intermediate pH range of about 7.0 to about 8.6, a second fraction which has an isoelectric point in a lower pH range and a third fraction which has an isoelectric point in a higher pH range, which comprises: dissolving the said impure relaxin preparation in an aqueous solution brought to a pH in said intermediate range, contacting the said solution with a granular cation exchange resin consisting of a copolymer of methacrylic acid and divinyl benzene and containing about 5% divinyl benzene, which cation exchange resin has been buffered at the pH of the said aqueous solution, whereby those fractions of the relaxin preparation whose isoelectric points are above the pH of the said aqueous solution are adsorbed on the said cation exchange resin, the aqueous solution being brought to a pH near the lower end of said intermediate range where it is desired to adsorb the first and third fractions, the said solution being brought to a pH near the upper end of said intermediate range where it is desired to adsorb the third fraction, washing unadsorbed material from the resin, and then eluting adsorbed material from said resin and thereby regenerating the resin.

5. The process of treating an impure relaxin preparation having a fraction which has an isoelectric point in the pH range of about 7.0 to about 8.6 and a second fraction which has an isoelectric point in a higher pH range, which comprises: dissolving the said impure relaxin preparation in an aqueous solution brought to a pH of at least about 8.6, contacting the said solution with a carboxylic acid type cation exchange resin which has been buffered at the pH of said aqueous solution whereby the second of said fractions of the relaxin preparation is adsorbed on the said cation exchange resin, and washing the resin to remove therefrom unadsorbed material contained in the first of said fractions.

6. The process of treating an impure relaxin preparation having a fraction which has an isoelectric point in a pH range of about 7.0 to about 8.6 and a second fraction which has an isoelectric point in a lower pH range, which comprises: dissolving the said impure relaxin preparation in an aqueous solution brought to a pH below about 7.0, contacting the said solution with a carboxylic acid type cation exchange resin which has been buffered at the pH of said aqueous solution whereby the first of said fractions of the relaxin preparation is adsorbed on the said cation exchange resin, washing the resin to remove therefrom unadsorbed material contained in the second of said fractions, and then eluting adsorbed material from said resin and thereby regenerating the resin.

7. The process of treating an impure relaxin preparation having a fraction which has an isolectric point in the pH range below 4.5 and a second fraction which has an isolectric point in a higher pH range, which comprises: dissolving the said impure relaxin preparation in an aqueous solution brought to a pH to about 4.5, contacting the said solution with a carboxylic acid type cation exchange resin which has been buffered at the pH of said aqueous solution whereby the second of said fractions of the relaxin preparation is adsorbed on the said cation exchange resin, washing the resin to remove therefrom unadsorbed material contained in the first of said fractions, and then eluting adsorbed material from said resin and thereby regenerating the resin.

8. The process of treating an impure relaxin preparation having a fraction which has an isoelectric point in the pH range below 5.0 and a second fraction which has an isolectric point in a higher pH range, which comprises: dissolving the said impure relaxin preparation in an aqueous solution brought to a pH of about 5.0, contacting the said solution with a carboxylic acid type cation exchange resin which has been buffered at the pH of said aqueous solution whereby the second of said fractions of the relaxin preparation is adsorbed on the said cation exchange resin, washing the resin to remove therefrom unadsorbed material contained in the first of said fractions, and then eluting adsorbed material from said resin and thereby regenerating the resin.

9. The process of treating an impure relaxin preparation having a fraction which has an isoelectric point in the pH range below 5.5 and a second fraction which has an isoelectric point in a higher pH range, which comprises: dissolving the said impure relaxin preparation in an aqueous solution brought to a pH of about 5.5, contacting the said solution with a carboxylic acid type cation exchange resin which has been buffered at the pH of said aqueous solution whereby the second of said fractions of the relaxin preparation is adsorbed on the said cation exchange resin, washing the resin to remove therefrom unadsorbed material contained in the first of said fractions, and then eluting adsorbed material from said resin and thereby regenerating the resin.

10. The process of treating an impure relaxin preparation having a fraction which has an isoelectric point in the pH range below 7.0 and a second fraction which has an isoelectric point in a higher pH range, which comprises: dissolving the said impure relaxin preparation in an aqueous solution brought to a pH of about 7.0, contacting the said solution with a carboxylic acid type cation exchange resin which has been buffered at the pH of said aqueous solution whereby the second of said fractions of the relaxin preparation is adsorbed on the said cation exchange resin, washing the resin to remove therefrom unadsorbed material contained in the first of said fractions, and then eluting adsorbed material from said resin and thereby regenerating the resin.

11. The process of treating an impure relaxin preparation having a fraction which has an isoelectric point in the pH range below 7.6 and a second fraction which has an isoelectric point in a higher pH range, which comprises: dissolving the said impure relaxin preparation in an aqueous solution brought to a pH of about 7.6, contacting the said solution with a carboxylic acid type cation exchange resin which has been buffered at the pH of said aqueous solution whereby the second of said fractions of the relaxin preparation is adsorbed on the said cation exchange resin, washing the resin to remove therefrom unadsorbed material contained in the first of said fractions, and then eluting adsorbed material from said resin and thereby regenerating the resin.

12. The process of treating an impure relaxin preparation having a fraction which has an isoelectric point in the pH range below 8.6 and a second fraction which has an isoelectric point in a higher pH range, which comprises: dissolving the said impure relaxin preparation in an aqueous solution brought to a pH of about 8.6, contacting the said solution with a carboxylic acid type cation exchange resin which has been buffered at the pH of said aqueous solution whereby the second of said fractions of the relaxin preparation is adsorbed on the said cation exchange resin, and then washing the resin to remove therefrom unadsorbed material contained in the first of said fractions.

References Cited in the file of this patent

Albert et al.: Endocrinology, vol. 40, June 1947, pp. 370–374, (pp. 370 and 373 relied upon).

Frieden et al.: Archives of Biochem., vol. 29, 1950, pp. 166–178 (pp. 166–168 relied upon).

Hirs: J. A. C. S., vol. 73, April-June 1951, p. 1893.

Kunin et al.: Ion Exchange Resins, 1950, John Wiley and Sons, Inc., New York, pp. 132–135.